United States Patent [19]
Lee

[11] Patent Number: 5,131,875
[45] Date of Patent: Jul. 21, 1992

[54] DUAL MOTOR CONTROL AND STEERING SYSTEM FOR WATERCRAFT

[76] Inventor: Warren D. Lee, Rte. 6, Box 246, Dunn, N.C. 28334

[21] Appl. No.: 597,546

[22] Filed: Oct. 12, 1990

[51] Int. Cl.⁵ .............................................. B60L 15/20
[52] U.S. Cl. .............................................. 440/7; 440/6; 114/153
[58] Field of Search .................... 440/6, 7, 53, 55, 56, 440/63, 87; 248/642, 641; 114/144 R, 144 E, 144 A, 153; 74/480 B, 478, 512, 560

[56] References Cited

U.S. PATENT DOCUMENTS

| | | | |
|---|---|---|---|
| 2,213,520 | 9/1940 | Gentry | 440/7 |
| 2,654,335 | 10/1953 | Ball | 114/153 |
| 2,804,838 | 9/1957 | Moser | 440/7 |
| 3,711,755 | 1/1973 | Meyer, Jr. | 440/6 X |
| 3,980,039 | 9/1976 | Henning | 440/6 |
| 3,995,579 | 12/1976 | Childre | 440/7 |
| 4,537,144 | 8/1985 | Horton | 114/61 |
| 4,555,233 | 11/1985 | Klammer et al. | 440/6 X |
| 4,734,068 | 3/1988 | Edwards | 440/56 |
| 4,841,203 | 6/1989 | Gilbert | 114/153 X |
| 4,854,902 | 8/1989 | Havins | 440/7 |

Primary Examiner—Edwin L. Swinehart
Attorney, Agent, or Firm—Dowell & Dowell

[57] ABSTRACT

A propulsion and steering system for dual motors mounted to a boat, especially of the trolling type, which incorporates a pair of foot pedals which are electrically connected between a battery and the motors and which are operable to independently control the direction of thrust and speed of the motors so that the motors are used to both propel and steer the boat.

13 Claims, 4 Drawing Sheets

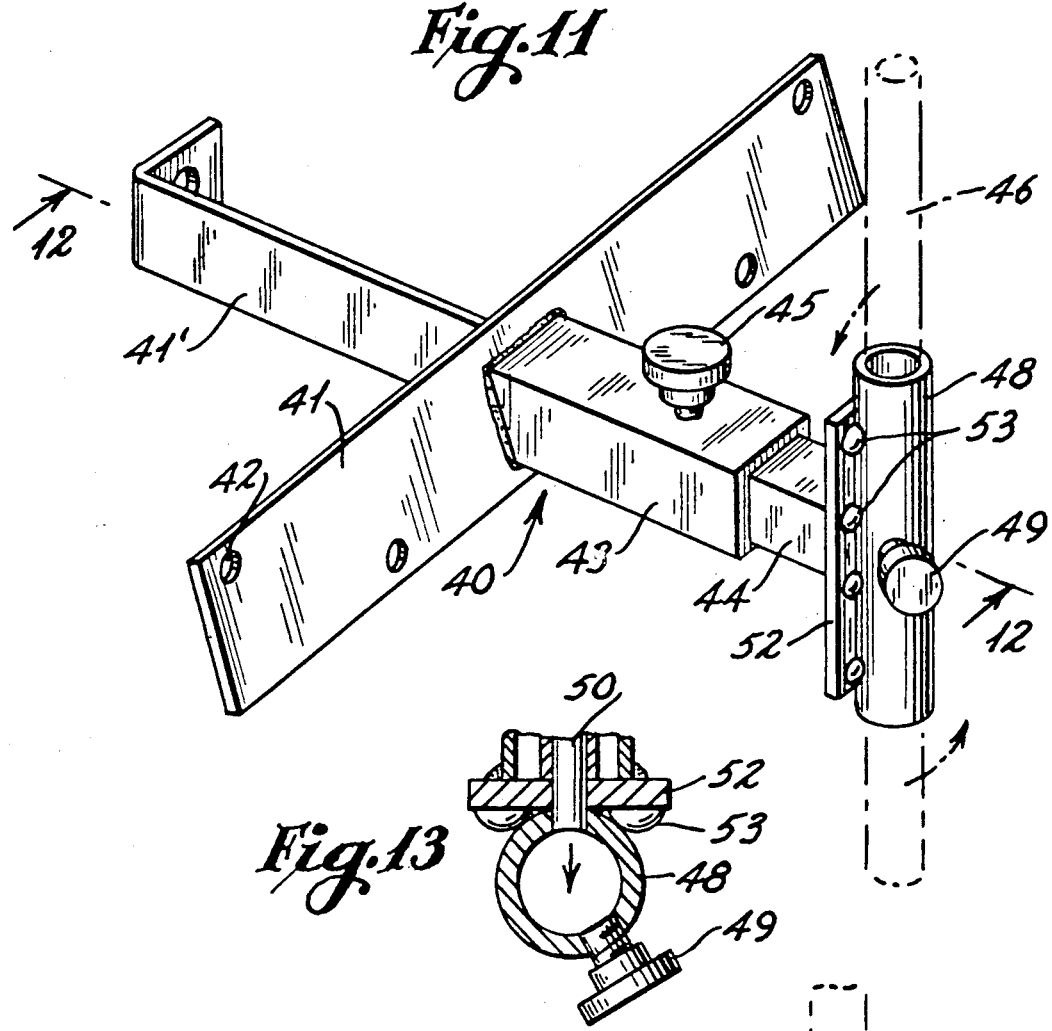
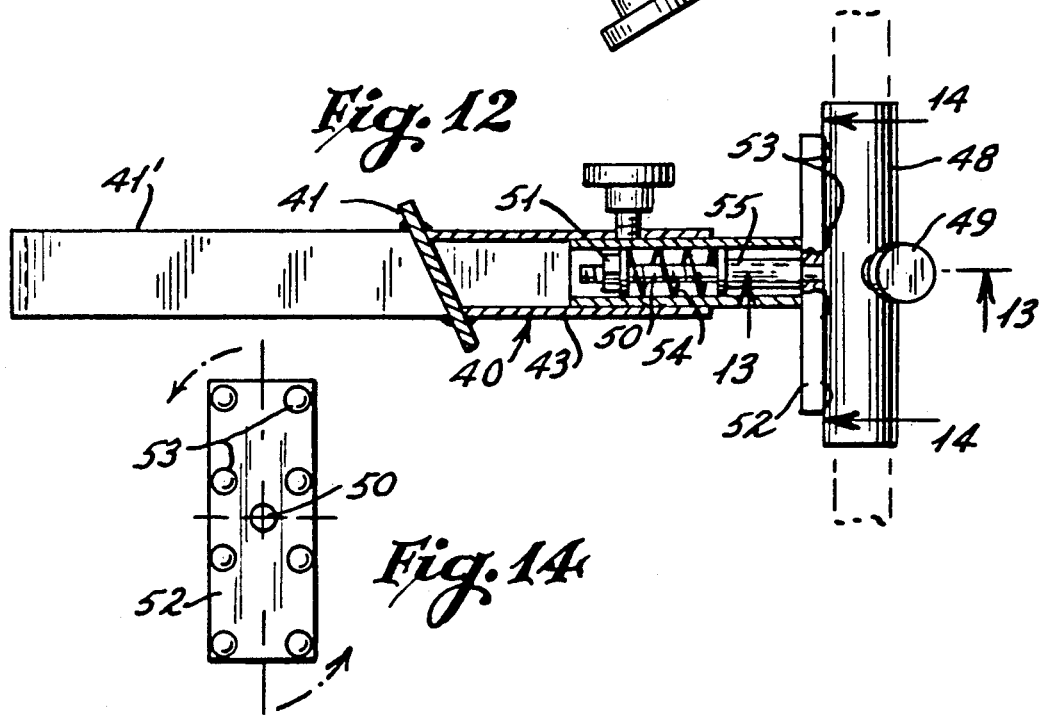

DUAL MOTOR CONTROL AND STEERING SYSTEM FOR WATERCRAFT

BACKGROUND OF THE INVENTION

1. Field of the Invention

This invention is generally directed to propulsion and steering devices for watercraft and, more specifically, to such devices which utilize a pair of independently operable motors to provide both the thrust and steering capability for the craft and which includes separate foot pedal controls for both activating the motors and for controlling the direction of thrust, either forward or reverse, and for also regulating the speed of the motors in a forward or reverse direction depending upon the movement of the foot pedals. The invention is also directed to adjustable brackets for mounting the motors with respect to the watercraft so that the motors may be easily and conveniently mounted in such a manner that the motors will automatically pivot upwardly if any subsurface obstruction is encountered so as to prevent damage to the props of each motor.

2. History of the Related Art

Over the years there have been a number of innovations directed to enabling small watercraft to be powered and steered by a propulsion system. Many of these systems are specifically designed to facilitate the use of watercraft for sport fishing and thus utilize controls which are manipulated by an individual's feet so that the fisherman's hands remain free to facilitate the use of fishing rods and other fishing equipment. One such combination propulsion and steering unit is disclosed in U.S. Pat. No. 2,654,335 to Ball. In this patent a single electrical motor is mounted to the stern board and is powered by an electrical source through a pair of foot pedals which, when manipulated, establish an electrical circuit between the battery and the motor. The patent further discloses the use of a rope and pulley system to turn the motor with the ropes being connected to the pedals so that the ropes are moved simultaneously with the movement of the control pedals. Unfortunately, with this type of system, it is not always possible to accurately control the steering of the boat and coordinate the steering with the propulsion provided by the motor. The use of ropes and pulleys not only interferes with the internal use of the boat but also, when tied to the tiller, only enables a limited amount of steering to be achieved through the tiller apparatus. Such a system also does not provide for a reversal of the propulsion system so as to enable a reverse movement of the boat and therefore all movement must be in a forward direction. The steering is further limited in that the invention discloses the use of a single motor which must be turned relative to the stern of the boat in order to steer the boat. Such single motor steering allows the boat to slip relative to the surface of the water when making turns and therefore, the boat cannot be turned on itself or about a single vertical axis. A similar type of single motor arrangement having foot controlled electronics mounted between a source of power and a motor is disclosed in U.S. Pat. No. 2,804,838 to Moser.

To further facilitate the steering control which is possible utilizing a combined propulsion and steering system, in U.S. Pat. No. 2,213,520 to Gentry, a system is disclosed which incorporates two separate electrical motors which are mounted to the two opposite sides of a boat or watercraft. Utilizing a dual motor system it is possible to use reverse propulsion of one motor relative to the other in order to assist in turning the boat about itself, thereby facilitate steering of the boat during use. In the patent, each of the motors is connected to a source of electrical energy through a foot control rod which is pivotable between a forward and a reverse position. When the control rods are pushed forwardly, contact is established which energizes the motors so that their propellers rotate in a forward direction, and when the control unit is pulled rearwardly, a separate contact is established reversing the flow of energy through the motors and thereby reversing the direction of thrust, so that the motors are rotating in reverse so as to propel the boat in a reverse direction. By operating one motor in a forward direction and one in a reverse, the boat can rotate about a single vertical axis. Unfortunately, the motor control system only enables an electrical contact to be made to either power the motors in a forward or reverse direction, with the speed of the motor being the same in either case. As the amount of thrust developed by the motors cannot be varied, the amount of steering control of the watercraft is severely limited and excessive turbulence will be created which decreases the safe operation of the motors and also disturbs fish when the boat is being used for fishing purposes. The patent further discloses mounting brackets for mounting the motors relative to the sides of a boat so that the depth of the propellers may be changed as is necessary. The mounting brackets, however, do not permit the motors to yield or pivot vertically and should any subsurface obstruction be encountered it is possible that the props or propellers blades associated therewith will become damaged.

Additional examples of electrically powered watercraft having steering controls are disclosed in U.S. Pat. No. 3,995,579 to Childre and 4,537,144 to Horton.

SUMMARY OF THE INVENTION

This invention is directed to a propulsion and steering system for watercraft and especially to such a system which incorporates a pair of electric motors which are connected to a source of electrical energy through a pair of foot operable pedals which include circuitry for not only activating each of the motors but also for regulating both the direction of thrust and the speed of the motors independently of one another. Each foot control pedal includes a pair of contact switches for initiating activation of a motor either in a forward or reverse direction and further includes a pair of control circuits incorporating potentiometers for regulating the speed of the motor in either a forward or reverse direction, depending upon the degree of depression of the foot control pedals.

The control pedals and circuitry of the primary embodiment are sufficient for controlling motors of low voltage. For motors that have a large current draw, a supplemental switching circuit is provided which is connected intermediate the motor and each of the foot control pedals. Such circuit includes a relay switch which operates to normally connect the motor to the toe and heel switch of each control pedal.

In a further embodiment of the present invention the electrical motors are mounted to the watercraft by special mounting brackets which not only allow selective horizontal and vertical adjustment of the motors to adjust the height of the props with respect to the waterline, but also include a pivotable vertical support which may be deflected to allow each motor to move vertically in the event any subsurface obstruction is encountered thereby preventing any damage to the prop associated with each motor.

It is a primary object of the present invention to provide a combination propulsion and steering system for watercraft which enables the independent control of a pair of electrical motors through foot pedals having circuitry which not only initiates activation of each motor independently of one another but also controls the direction of propulsion and the speed of each motor whereby the speed and steering of the vehicle is positively controlled through the operation of the foot control pedals.

It is also an embodiment of the present invention to provide an electrical control system for watercraft wherein a pair of motors are controlled through foot pedals with the speed of the motors being directly related to the amount of pivotable movement of the pedals, either in a forward or reverse direction.

It is a further object of the present invention to provide a propulsion and steering system for watercraft wherein electrical motors having larger current draws may be controlled by supplementing the primary pedal control circuit with a switching circuit which will prevent any overload being placed on the primary pedal circuit.

It also an object of the present invention to provide a propulsion and steering system for watercraft wherein a pair of motors are mounted by special mounting brackets to the side of the watercraft so that the motors may be adjusted both horizontally and vertically to regulate the placement and depth of the propellers associated therewith and which also provide a quick release for allowing the motors to pivot vertically in the event a subsurface obstruction is encountered in either forward or reverse travel.

BRIEF DESCRIPTION OF THE DRAWINGS

FIG. 11 is a perspective view of one of the motor mounting brackets of the present invention.

FIG. 12 is a cross section taken along lines 12—12 of FIG. 11.

FIG. 13 is an enlarged cross sectional illustration taken along lines 13—13 of FIG. 12.

FIG. 14 is a view of the retention plate associated with the bracket assembly of the present invention taken along lines 14-14 of FIG. 12.

DESCRIPTION OF THE PREFERRED EMBODIMENT

Figure 1:
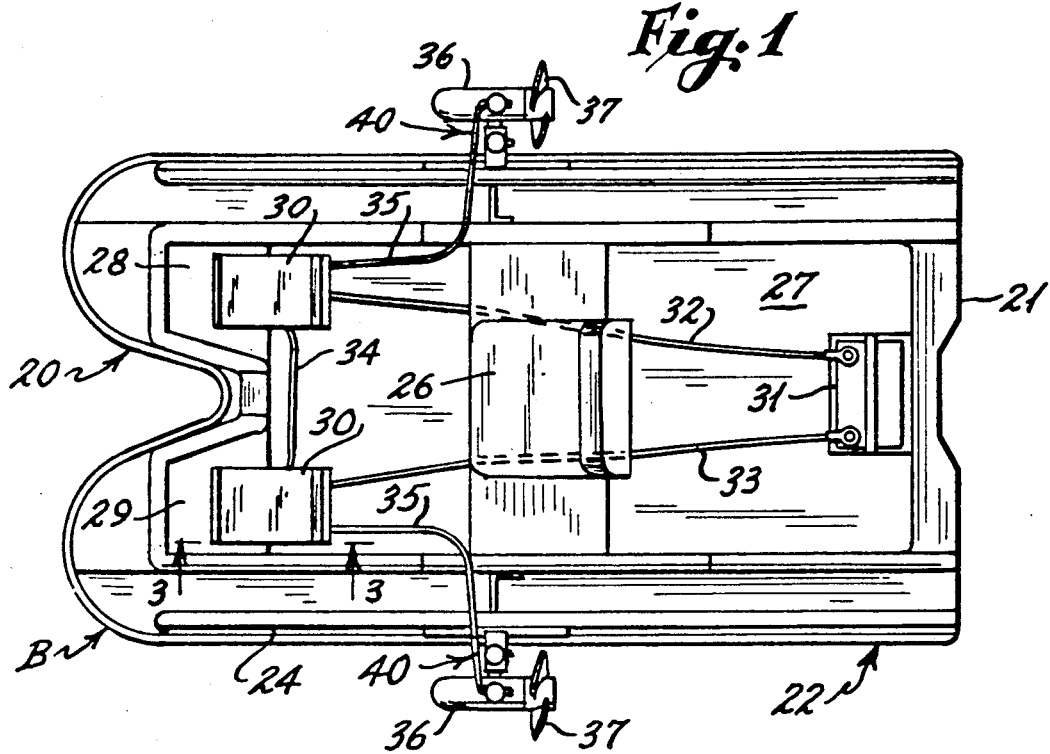
FIG. 1 is a top plan view of a watercraft having the propulsion and steering controls of the present system mounted thereto.

With continued reference to the drawings, the propulsion and steering system of the present invention is shown as being utilized with a small boat or watercraft B which is shown as being a one man boat utilized for fishing and which includes a bifurcated bow 20, stern 21, and side walls 22 and 23 having gunwales 24 and 25, respectively. A single seat 26 is mounted between the side walls so as to be elevated with respect to the bottom 27 of the boat. The forward portion of the bottom or floor 27 includes a pair of inclined ramps 28 and 29 on which the foot control pedals 30 of the present invention are mounted.

Figure 4:
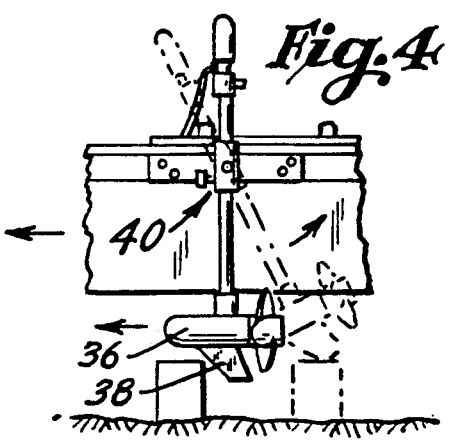
FIG. 4 is a partial side elevational view of the watercraft of FIG. 2 showing the movement of the motor assembly upon the encountering of a subsurface obstruction.

The propulsion and steering system of the present invention includes left and right pedals 30 which are electrically connected to a battery 31 through electrical lines 32 and 33. The foot pedals are themselves electrically connected through an intermediate line 34. Each foot pedal is further connected through a pair of electrical lines 35 to one of the electrical motors 36. The electrical motors 36 are mounted to the gunwales 24 and 25 utilizing mounting brackets 40. In the preferred embodiment, the electrical motors are conventional electrical motors and generally are of a horsepower rating of one or less. Each motor 36 includes a rearwardly mounted prop 37 which is shown as being mounted behind a fin assembly 38 so that the fin assembly protects the propellers 37 from engaging subsurface obstructions, as is shown in FIG. 4.

With particular reference to FIGS. 11-14, the mounting brackets 40 each include a base plate 41 which is secured to the side wall of the boat adjacent the gunwale by a plurality of bolts or similar fasteners which are mounted through openings 42 provided in the plate. Extending inwardly of the base plate is a secondary anchor arm 41' which may be used to bolt the bracket to an inner surface portion of the boat through openings in the side walls if additional stability for the mounting brackets is necessary. A hollow housing 43 is welded or otherwise secured to the plate 41 and extends horizontally therefrom. As shown in the drawings, the housing 43 is generally rectilinear in cross section. A telescoping member 44 is slidingly received within the housing 43 and is secured thereto by a locking screw 45 so that the degree of extension of the motors horizontally with respect to the side walls of the boat may be selectively adjusted. Each motor is shown as being mounted on an elongated handle of 46 having an upper handgrip portion 47 which permits the handle to be engaged by an individual seated within the boat. The mounting brackets further include a pivotable support tube 48 which in FIG. 11 is shown as being generally vertically oriented and through which the handle 46 is mounted. The handle at 46 is locked within the tube 48 by a second locking screw 49. The tube 48 is welded to a threaded shaft 50 which extends within the telescoping member 44 and which is secured therein by a nut 51 which engages the end portion of the threaded member. The support 48 is resiliently urged against a retention plate 52 having a plurality of spaced protrusions 53 formed on the face thereof so as to be spaced on either side of the support tube 48.

Figure 2:
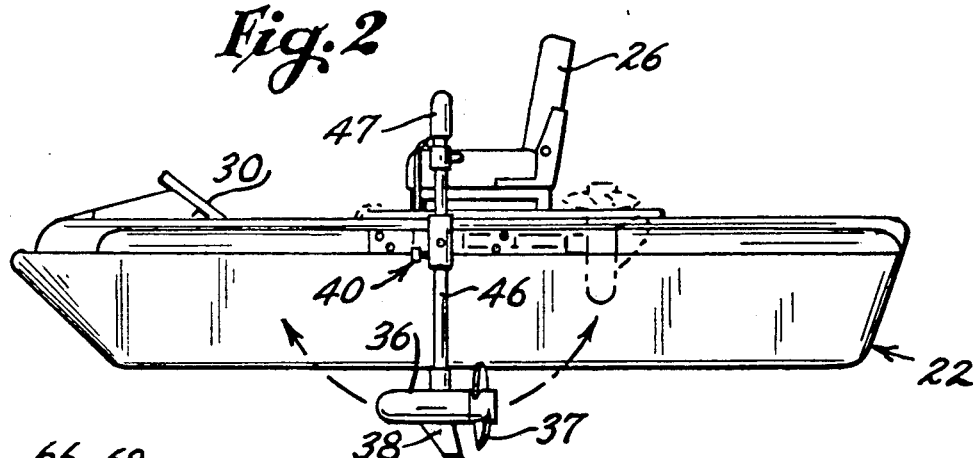
FIG. 2 is a side elevational view of the watercraft of FIG. 1 showing the vertical pivoting movement of one of the motors, both forwardly and rearwardly, made possible by the mounting brackets of the present invention.
Figure 3:
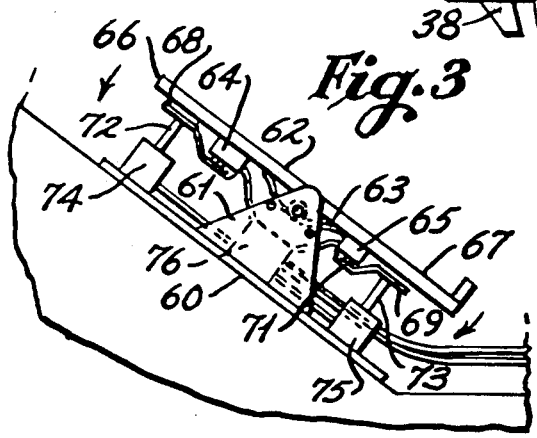
FIG. 3 is an enlarged side elevational view taken along lines 3—3 of FIG. 1.

During normal use, the support tube 48 is retained between the protrusions 53 and is oriented generally vertically as shown in solid line in FIGS. 2 and 3. However, in order to allow the motor to be pivoted upwardly, either forwardly or rearwardly, as shown in dotted line in FIG. 2 in the event an obstruction is encountered such as by the fin 38 associated with the motor housing hitting an object as shown in FIG. 4, the support tube 48 may be urged outwardly with respect to the protrusions 53 and thereafter rotated as indicated by the arrow in FIG. 4 (or arrows in FIG. 2). The resilient mounting of the support tube is accomplished by providing a spring 54 which is compressed between the lock nut 51 and a sleeve 55 disposed adjacent the outer portion of the telescoping member 44. By adjusting the tension on the spring 54, the support tube 48 may be drawn into tighter engagement with the plate 52, thereby making it more difficult to rotate from its vertically mounted position. The tension, however, should be set so that the support tube 48 may be urged outwardly against the spring 54 and relative to retention plate 52, thereby allowing the tube 48 to be rotated in the event an obstruction is encountered.

It should be noted that as opposed to utilizing a plurality of spaced projections 53, that elongated vertical ridges may be provided on either side of the plate 52 in close proximity to the support tube 48. In either case, it is preferred that the projections provide a horizontal seat for the motor so that when the motors are not in use the operator of the boat may engage the handgrips of the motor support handles 46 and rotate the same to a locked horizontal position relative to the mounting plates 52, as is indicated by dotted line in FIG. 2 of the drawings. In these instances, the spring tension will urge the support tube 48 in between opposing and vertically spaced pairs of the protrusions 53.

Utilizing the bracket assembly of the present invention it is therefore possible to horizontally extend the support tube 48 relative to the side walls of the watercraft and also to allow the handles supporting the motors to be vertically oriented to change the depth of the propellers. The mounting assembly also allows the automatic deflection of the motor assemblies vertically by pivoting against the plates 52 in the event subsurface obstructions are encountered, thereby protecting the propellers at all times.

As was previously discussed, each of the motors 36 is independently controlled by one of the foot pedals 30 of the present invention. Further, the electrical circuitry of each pedal allows each motor to be operated either in a forward or reverse direction and also provides for controlling the speed of each motor from a range from a dead stop to a maximum thrust for the propeller blades. As specifically shown in FIG. 3, each foot control pedal 30 includes a base plate 60 having a pair of vertically spaced brackets 61 extending upwardly therefrom and to which a pedal 62 is pivoted by way of pivot pin 63. Each pedal is normally retained in a neutral position where it is relatively parallel to the base plates 60 by spring members 63 so that if foot pressure is released from the pedals each pedal will assume what will be referred to as a neutral position in which the motors are not electrically connected to the source of electrical current.

The foot control assemblies further include a pair of on-off switches 64 and 65. Switches 64 control the motors, placing them in an ON condition in a forward thrust mode, whereas, switches 65 activate the motors in a reverse direction. Each switch 64 is associated with the toe portion 66 of pedal 62, whereas switch 65 is associated with the heel portion 67 of the pedal. Each switch 64 includes a depending contact which is engaged with levers 68 and 69 which are pivotally connected adjacent each switch housing as shown. The depending electrical contacts are shown at 70 and 71. In a neutral position, the contacts 70 and 71 are not urged inwardly of the switches and therefore the switches remain in an OFF position. Each switch lever 68 and 69 includes an outer end portion mounted above slide contacts 72 and 73 associated with a pair of potentiometers 74 and 75, which are mounted to the base plate. Each of the potentiometers is electrically connected to a control module 76 mounted centrally of each foot pedal by an electrical circuit which will be described in greater detail hereinafter.

To activate switches 70 and 71, if the foot plate is depressed so that the toe portion 66 is urged downwardly the outer portion of the switch lever 68 will engage the slide contact 72 of the potentiometer 74 thereby initially engaging the electrical contact 70 of switch 64. This movement initially activates the motor to which the foot pedal is electrically connected. Further depression of the pedal with the toe in a downward position will cause a movement or shifting of the slide contacts 72 relative to potentiometer 74 thereby continuously increasing the power being supplied to the motor and therefore the motor speed. Once pressure is released from the toe portion 66 of the foot pedal 62 the spring member 63 will automatically bring the foot pedal into a neutral position thereby releasing contact 70 and deactivating the motor 36 to which the foot pedal is connected.

In a like manner, activation of the motor in a reverse direction is accomplished by depressing the heel portion 67 of the foot pedal 62 so that the switch lever 69 engages the slide contact 73 associated with potentiometer 75 thereby applying electrical energy to the motor in a reverse direction by activating switch contact 71 associated with switch 75. Further depression of the heel portion 67 of the foot pedal 62 results in increasing the speed in a reverse direction of the motor by depressing the potentiometer slide contact 73. Upon release of the foot pedal 62 the spring 63 will return the foot pedal to a neutral position thereby deactivating or cutting the supply of electrical energy to the motor.

Figure 5:
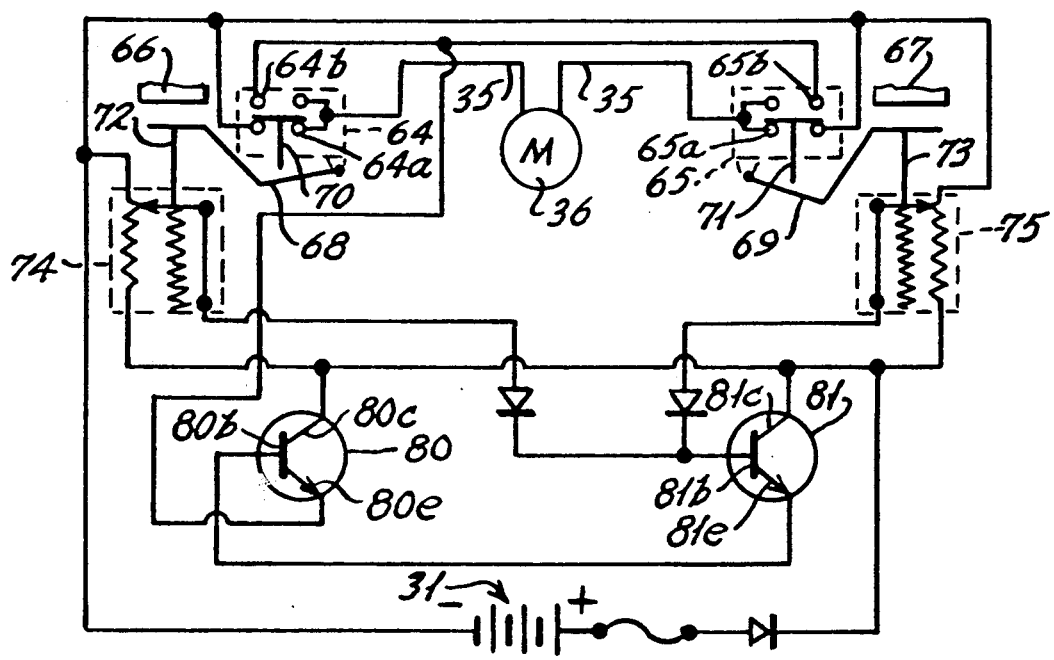
FIG. 5 is an electrical circuit diagram showing the motor control assembly of one of the foot pedals of the present invention when in a neutral position.
Figure 6:
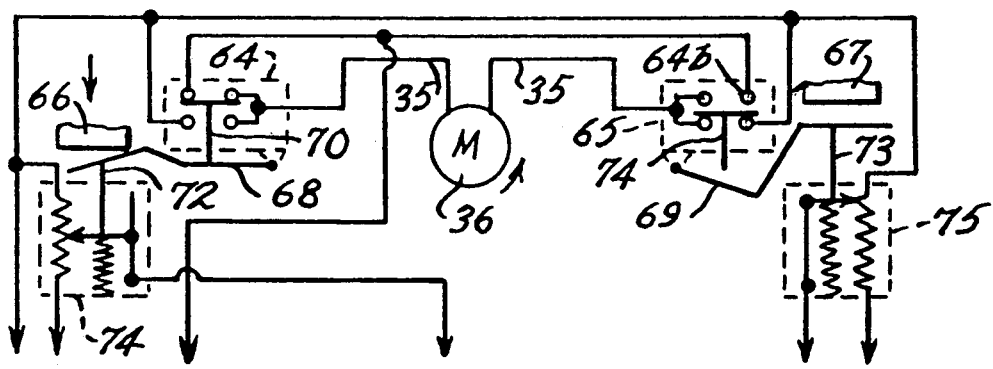
FIG. 6 is an electrical diagram associated with one of the motor control foot pedals of the present invention when the pedal is in a toe-down position.
Figure 7:
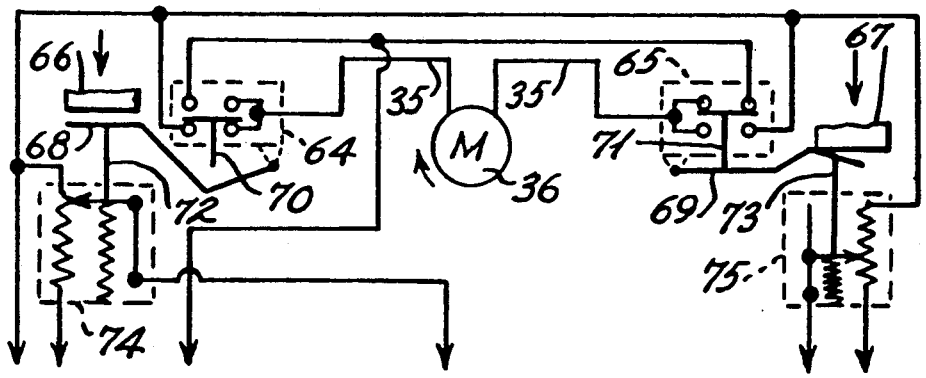
FIG. 7 is an electrical diagram associated with the circuit of one of the foot control pedals of the present invention wherein the heel is in a down position.

With reference to FIGS. 5-7, the control circuitry associated with each food control pedal 30 is shown in greater detail. In FIG. 5, the circuitry is shown with the foot pedal in a neutral position wherein no energy is supplied to the motors 36, whereas in FIG. 6, the circuitry is shown with switch 64 being activated so as to supply energy through potentiometer 74 to a motor 36 to rotate the motor in a first direction, whereas in FIG. 7, the foot pedal 30 is shown with the heel depressed thereby reversing the rotation of the motors 36.

The control circuitry includes a pair of NPN transistors and 81. The emitter 80e, of transistor 80, is shown as being electrically connected to the ON contacts 64b and 65b of switches 64 and 65, whereas the collector 80c, of transistor 80, is electrically connected through the potentiometers 74 and 75 to the negative side of battery 31. The base 80b of transistor 80 is connected to the emitter 81e of transistor 81 while the collector 81c of transistor 81 is electrically connected through potentiometers 74 and 75 to the negative side of battery 31. Power between the base 81b of transistor 81 is regulated through a pair of diodes 82 and 83 which are connected to the control side of the potentiometers 74 and 75. In this manner, transistor 81 is utilized to regulate the power to the base 80b of transistor 80 depending upon the setting of either of the potentiometers 74 and 75. In the position shown in FIG. 5 wherein the pedal is in a neutral position neither of the potentiometers are activated and therefore no current flows to the base of transistor 81 and consequently the base of transistor 80 is also not powered. Also, when the foot pedal is in a neutral position, no current flows to the emitter 80e of transistor 80 and the circuit is thereby shunted even though the battery is shown as being connected to the motor 36. In this position both switches 64 and 65 are in an OFF position and no power or energy is supplied from the battery 31 to the motor 36.

With respect to FIG. 6 of the drawings, if the toe portion of the pedal is depressed, upon the initial movement of switch lever 68, contact 70 will be raised, thereby contacting the motor with electrical contact 64b of switch 64 and establishing a circuit which will cause transistor 80 to complete the circuit acting as a switch between the motor and the battery. Upon further depression of the toe portion 66 of the foot pedal the potentiometer slide contact 72 will be depressed thereby decreasing the resistance there through. Current flow through the potentiometer and transistors 80 and 81 will regulate the amount of current being supplied to the motor from the battery 31. The motor will be activated so as to rotate in a first or forward direction as indicated by the arrow in the drawing figures.

With respect to FIG. 7 of the drawings, a diagram is shown wherein the heel portion 67 of the foot pedal is depressed thereby closing the switch lever 69 against switch contact 71 creating a circuit between the motor and a transistor 80 through contact 65b. In this position switch contact 70 of switch 64 returns to its original contact position of 64a. Again, upon continued lowering of the heel portion 67 of the pedal, the potentiometer slide contact 73 is depressed thereby regulating the power through the potentiometer which power is used to control the motor speed through the transistor circuit. In this embodiment, the current flow from the battery is reversed through the motor and the motor operates in a reverse direction as indicated by the arrow in the drawing figure. Upon release of the heel portion 67, relative to the switch lever 69, the switch lever will be returned to its initial position wherein both switches 64 and 65 will be in an OFF condition.

From the foregoing it is noted that the control circuitry associated with each foot pedal of the present invention allows for the initial activation of switches 64 and 65 and thereafter for the progressive increase in energy depending upon the amount of depression of the foot pedal relative to the potentiometers associated with the heel and toe portions of the foot pedal. Therefore, not only is the direction of rotation of the motor controlled by the foot pedal circuitry of the present invention but also the amount of propulsion energy supplied to the motor is controlled directly by the movement of the foot control pedals.

Figure 9:
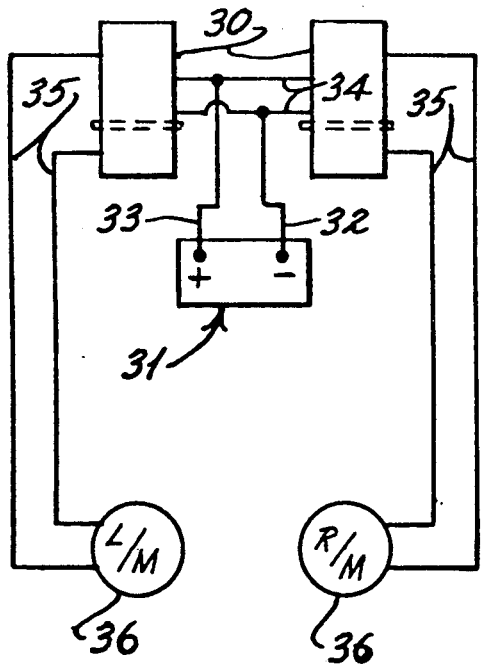
FIG. 9 is a simplified circuit diagram showing the foot pedals and motors of the present invention.

With respect to FIG. 9 of the drawings, a schematic layout of the foot control pedals as utilized in combination with small low voltage motors i.e., those of approximately one horsepower or less, is disclosed. It is noted that the battery is connected between the two foot pedals with the output energy from the foot pedals being directed to each of the left and right hand motors independently.

Figure 10:
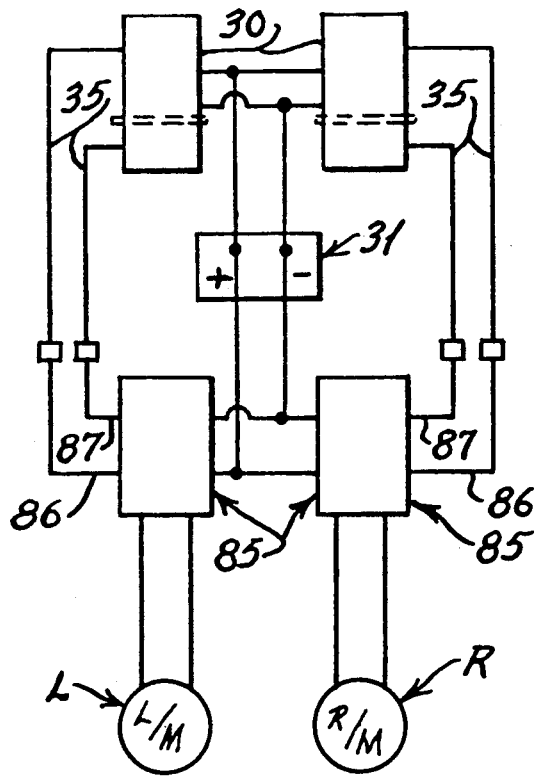
FIG. 10 is a simplified circuit diagram showing the foot control pedals of the present invention as they are wired with respect to the auxiliary control circuit shown at FIG. 8 in order to control larger motors.

In those instances where the motors to be driven draw greater electrical current, it is necessary to provide additional relay control circuitry between the foot control pedals and each of the motors to prevent damage to the foot control circuits. With specific reference to FIG. 10, the foot pedals 30 are shown as being mounted to auxiliary control circuits 85 which are connected between each of the foot control pedals and the left and right hand motors, L and R, as generally indicated in the drawing figure. It should be noted that a separate intermediate control circuit 85 is necessary between each control pedal and each motor. The detailed layout of the additional control circuit is disclosed in FIG. 8.

Figure 8:
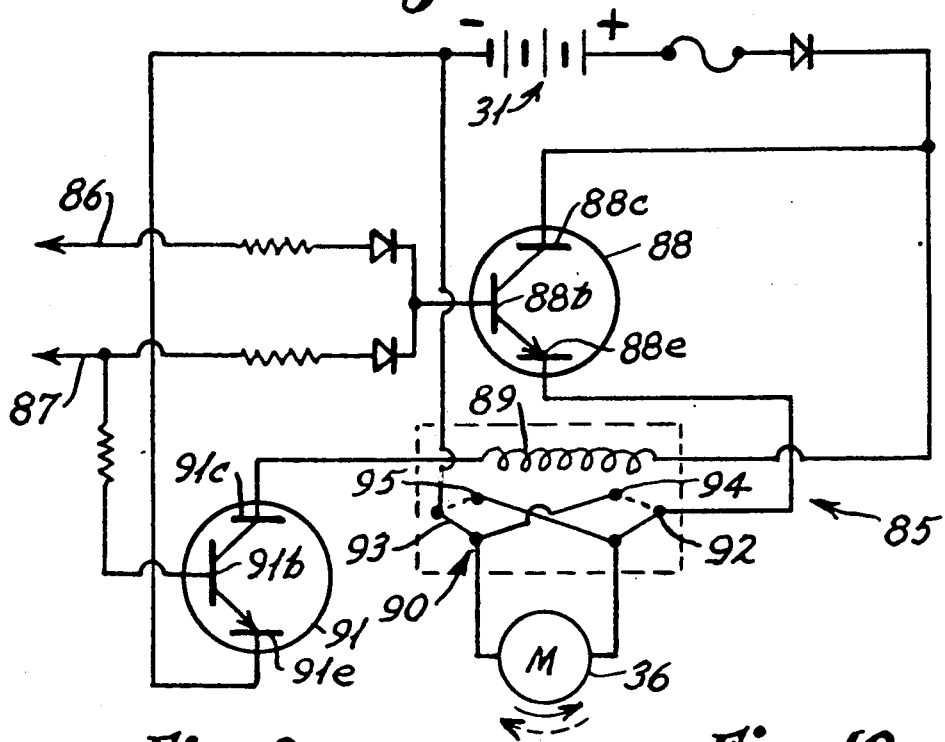
FIG. 8 is an electrical diagram of an auxiliary control relay circuit which is connected to the toe and heel outputs to the motor of the electrical circuit shown in FIG. 5 which enables the control system to be utilized with motors having larger horsepower ratings.

In FIGS. 7 and 8, the auxiliary control circuit is shown as including a pair of inputs 86 and 87 which are designed to be connected to the wires 35 associated with each of the toe and heel switches 64 and 65 and which connect the switches with a motor 36. Line 86 will be assumed to connect to line 35 intermediate switch 64 and motor 36, while line 87 is connected to line 35 intermediate switch 65 and motor 36. When connected, power through either of the lines 86 and 87 as directed through resistors and diodes to the base 88b of transistor 88. The collector 88c of the transistor 88 is electrically connected to the positive side of the battery and through the coil 89 of a relay switch 90 to the collector 91c of secondary 91. The emitter 91e of transistor 91 is connected to the negative side of the battery with the base 91b of the transistor being biased by input from line 87 extending from the heel control switch 65 through a resistor. The emitter 88e of transistor 88 is shown as being electrically connected to one contact 92 of switch 90 which is normally in a closed contact position with respect to the motor 36 so that a circuit is established through the motor and through a normally closed second contact switch 93 to the negative side of the battery. Due to the circuit arrangement, under normal circumstances, the closed contacts of relay switch 90 will automatically switch the circuit for operation of the motor in a forward direction until such time as the voltage received through the input line 87 upon depression of the heel portion of the control pedal is such as to bias transistor 91 thereby allowing current to flow from the battery and through the transistor to activate the coil 89 associated with relay switch 90. Activation of coil 89 will move contacts 92 and 93 into contact with contact elements 94 and 95 (as shown in dotted line in FIG. 7) to thereby reverse the direction of flow of energy through the motor 36. As soon as the foot pedal is returned to a neutral or "toe down" position, the controls 92 and 93 of the relay switch will automatically close, thereby placing the motor in circuit with the battery for forward operation of the motor.

I claim:

1. In a combination propulsion and steering system for watercraft which includes a pair of electrically operated motors for driving propellers and wherein separate mounting means are provided in spaced relationship to one another for suspending the motors from opposite sides of the watercraft and wherein a source of electrical power is provided for energizing the motors the improvement comprising, a pair of foot control means, first means for electrically connecting said source of electrical power energy to one of said foot control means and a first of said motors and second means for electrically connecting said source of electrical power to the other of said foot control means and the second of said motors, each of said foot control means including a pedal having toe and heel portions, means for pivotally supporting each of said pedals so that each pedal is pivotable about a single axis taken generally perpendicular to an elongated axis extending between said toe and heel portions of each pedal, said pedals being movable from a neutral position wherein neither of said toe and heel portions are depressed to a first position wherein said toe portion is depressed and a second position wherein said heel portion is depressed, each of said foot control means including a first switch means for activating said motors for operating in a first direction when said toe portion of said pedal is depressed, each of said foot control means having a second switch means for activating said motors in a reverse direction when said heel portion of said pedal is depressed, each of said foot control means including power regulating means operable in response to the depression of said toe and heel portions of said pedals to alter the power being supplied through said first and second switch means to thereby regulate the speed of said motors in a forward or reverse direction when activated by said first and second switch means whereby each of said foot control means controls a separate one of said motors so that the direction of thrust of each of said motors as well as the speed of each of said motors is separately controlled.

2. The combination propulsion and steering system of claim 1 in which each of said foot control means includes resilient means for biasing said pedals to said neutral position.

3. The combination propulsion and steering system of claim 1 in which said first switch means of each of said foot control means are mounted adjacent said toe portion of said pedals and said second switch means of each of said foot control means are mounted adjacent said heel portion of said pedals.

4. The combination propulsion and steering system of claim 1 in which said power regulating means of each of said foot control means includes first and second spaced power regulators, first means for activating said first switch means before said first power regulator is activated and second means for activating said second switch means before said second power regulator is activated.

5. The combination propulsion and steering system of claim 4 in which each of said first and second power regulators of each of said foot control means includes potentiometer means having an adjustable contract which is movable in response to the pivoting of said pedals.

6. The combination propulsion and steering system of claim 5 in which each of said foot control means includes a lever means mounted adjacent said first switch means and having an engagable portion extending between a first of said potentiometer means and said toe portion of said pedals, said first lever means closing said first switch means to activate a motor when said first of said potentiometer means engages said engagable portion thereof, a second lever means mounted adjacent said second switch means, said second lever means having a second engagable portion extending between a second of said potentiometer means and said heel portion of said pedals, said second lever means closing said second switch means when said second of said potentiometer means engages said second engagable means.

7. The combination propulsion and steering system of claim 6 including resilient means for biasing said pedals into said neutral position wherein neither said first or second switch means are activated.

8. The combination propulsion and steering system of claim 1 in which each of said foot control means includes an auxiliary control circuit means mounted between each of said pedal means and said motors, each of said auxiliary control circuit means including a normally closed relay for connecting said first switch means of each of said foot control means with said motors and said source of electrical energy, said relay including means responsive to the activation of said second switch means for activating said relay to reverse the flow of current therethrough so as to connect said motors to said source of electrical energy so that said motors operates in a reverse direction.

9. The combination propulsion and steering system of claim 1 in which the motors are carried by elongated handles and each of said mounting means for mounting said motors to said watercraft includes a bracket means having a base for attaching said bracket means to a side of said watercraft, a housing extending outwardly with respect to each of said bases, and extensible portion mounted within each of said housings and being slidable with respect thereto for adjusting the distance of said motors horizontally with respect to said watercraft, a support tube mounted to each of said extensible members, means for vertically adjustably mounting said handles of said motors from said support tubes, and pivot means for mounting said support tubes relative to said extensible members whereby said support tubes may be rotated in a vertical plane so that said motors will be raised automatically upon encountering any subsurface obstruction.

10. The combination propulsion and steering system of claim 9 in which each of said pivot means includes a plate means having a pair of spaced protrusions mounted thereon, resilient means for drawing said support tubes against said plate means intermediate said protrusions, and said support tubes being movable outwardly with respect to said support plates and over said protrusions so that said protrusions retain said support tubes in a substantially horizontal position.

11. A bracket assembly for mounting a boat motor to the side of a watercraft and wherein the motor is carried by an elongated handle, comprising a base, means for attaching said base to a side of said watercraft, a housing extending outwardly with respect to said base, an extensible portion mounted within said housing and being slidable with respect thereto for adjusting the distance of said motor horizontally with respect to said watercraft, a support means mounted to said extensible member, means for vertically adjustably mounting said handle of said motor from said support means, and pivot means for mounting said support means relative to said extensible member so that said support means may be pivoted in a vertical plane so that the elongated handle is pivoted to raise the motor from a first to a second position, said pivot means including retention means, means for resiliently biasing said support means and said retention means relative to one another for restraining said support means in said first position, said support means being automatically rotated in a vertical plane so that said motor will be moved from the first to the second position upon the motor encountering any subsurface obstruction when in the first position and will be restrained in the second position by said retention means.

12. The bracket assembly of claim 11 in which said means for resiliently biasing said support means includes a spring for urging said support means toward said extensible member.

13. The bracket assembly of claim 11 in which said retention means includes a plate means having a pair of spaced protrusions mounted thereon, said means resiliently biasing said support means against said plate means yieldably retaining said support means intermediate said protrusions, whereby said support means may be urged outwardly with respect to said support plate and over said protrusions so that said support means may pivot in the vertical plane.

* * * * *